United States Patent
Osmond

(10) Patent No.: US 8,886,586 B2
(45) Date of Patent: Nov. 11, 2014

(54) METHOD FOR MAKING OPTIMAL SELECTIONS BASED ON MULTIPLE OBJECTIVE AND SUBJECTIVE CRITERIA

(75) Inventor: Roger Frederick Osmond, Littleton, MA (US)

(73) Assignee: Pi-Coral, Inc., San Jose, CA (US)

( * ) Notice: Subject to any disclaimer, the term of this patent is extended or adjusted under 35 U.S.C. 154(b) by 578 days.

(21) Appl. No.: 12/782,495

(22) Filed: May 18, 2010

(65) Prior Publication Data

US 2010/0299298 A1 Nov. 25, 2010

Related U.S. Application Data

(60) Provisional application No. 61/180,877, filed on May 24, 2009.

(51) Int. Cl.
*G06F 17/00* (2006.01)
*G06N 5/02* (2006.01)
*G06N 5/04* (2006.01)
*G06N 3/00* (2006.01)
*G06N 99/00* (2010.01)

(52) U.S. Cl.
CPC .................. *G06N 5/025* (2013.01); *G06N 5/04* (2013.01); *G06N 5/02* (2013.01); *G06N 3/008* (2013.01); *G06N 99/005* (2013.01)
USPC .................... 706/47; 706/20; 706/25; 706/46

(58) Field of Classification Search
CPC ......... G06N 5/02; G06N 5/04; G06N 99/005; G06N 3/08; G06N 5/025
USPC ......................................... 706/20, 25, 46, 47
See application file for complete search history.

(56) References Cited

U.S. PATENT DOCUMENTS

| | | | |
|---|---|---|---|
| 6,256,675 B1 | 7/2001 | Rabinovich | |
| 6,463,454 B1 | 10/2002 | Lumelsky et al. | |
| 6,466,980 B1 | 10/2002 | Lumelsky et al. | |
| 8,087,025 B1 | 12/2011 | Graupner | |
| 2003/0074453 A1 | 4/2003 | Ikonen | |
| 2004/0210565 A1 | 10/2004 | Lu et al. | |
| 2005/0216428 A1 | 9/2005 | Yagawa | |
| 2005/0283487 A1 | 12/2005 | Karlsson et al. | |
| 2007/0156842 A1 | 7/2007 | Vermeulen et al. | |
| 2008/0168015 A1 * | 7/2008 | Thie et al. | 706/46 |
| 2008/0313328 A1 | 12/2008 | Dahlin et al. | |
| 2009/0048994 A1 | 2/2009 | Appelebaum et al. | |
| 2010/0306371 A1 * | 12/2010 | Osmond | 709/224 |

OTHER PUBLICATIONS

Fenton, Norman, and Wei Wang. "Risk and confidence analysis for fuzzy multicriteria decision making." Knowledge-Based Systems 19.6 (2006): 430-437.*

(Continued)

*Primary Examiner* — Jeffrey A Gaffin
*Assistant Examiner* — James F Sugent
(74) *Attorney, Agent, or Firm* — Pepper Hamilton LLP

(57) ABSTRACT

A method for making optimal decisions includes the ability to consider and weigh multiple factors, where those factors might be numeric, or non-numeric, objective or subjective. Further, the method ensures that factors are not prematurely eliminated. This contrasts with behavior common to decision-tree based approaches. The method further allows for weighting based on multiple statistical means as well as by the application of non-statistical values.

10 Claims, 4 Drawing Sheets

(56) References Cited

OTHER PUBLICATIONS

Zavadskas, Edmundas Kazimieras, Friedel Peldschus, and Zenonas Turskis. "Multi-criteria optimization software LEVI-4.0—A tool to support design and management in construction." 25th International Symposium on Automation and Robotics in Construction ISARC-2008 in EK Zavadskas A. Kaklauskas MJ Skibniewski (eds.), in The 25th International Symposium o.*

Bitarafan, M. R., and M. Ataei. "Mining method selection by multiple criteria decision making tools." The Journal of the South African Institute of Mining and Metallurgy 104.9 (2004): 493-498.*

Işiklar, Gülfem, and Gülçin Büyüközkan. "Using a multi-criteria decision making approach to evaluate mobile phone alternatives." Computer Standards & Interfaces 29.2 (2007): 265-274.*

Turskis, Zenonas, Edmundas Kazimieras Zavadskas, and Friedel Peldschus. "Multi-criteria optimization system for decision making in construction design and management." Inzinerine Ekonomika-Engineering Economics 1.61 (2009): 7-18.*

* cited by examiner

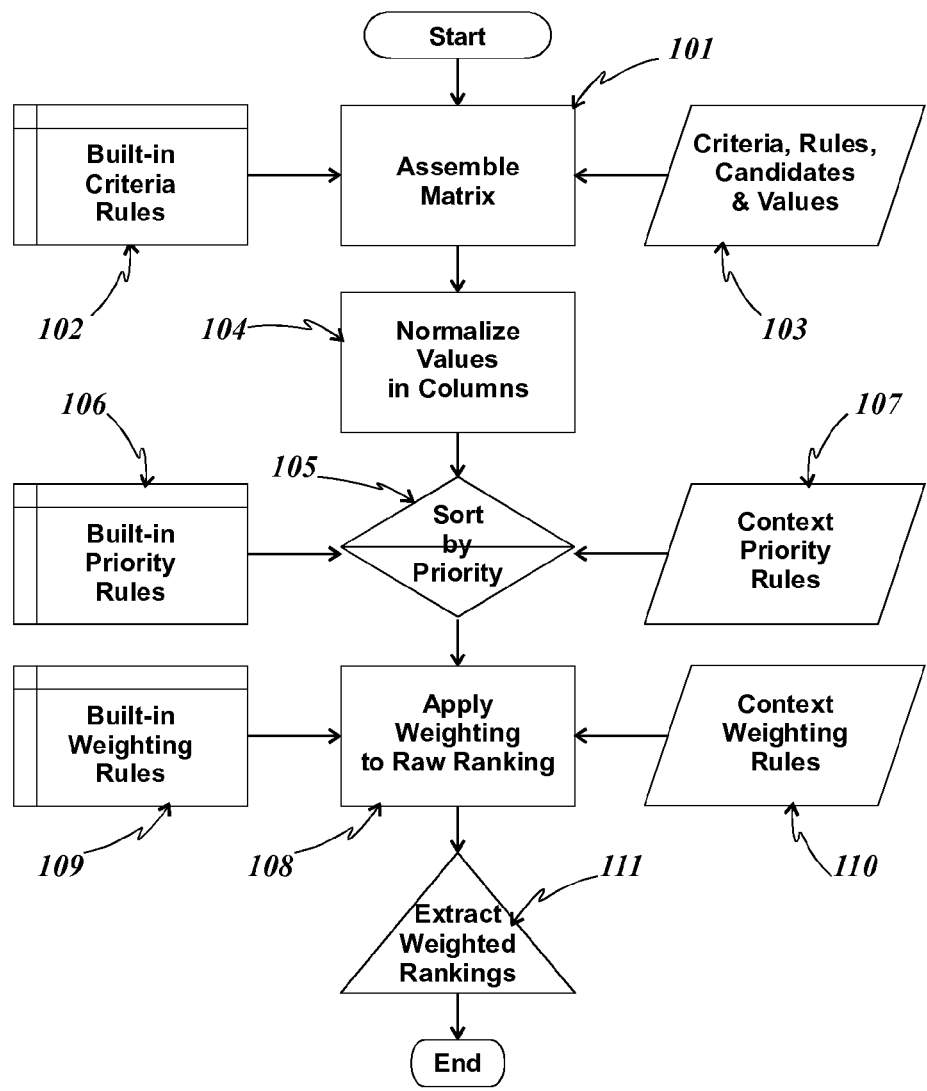
*FIG. 1 - Overall Logic Flow*

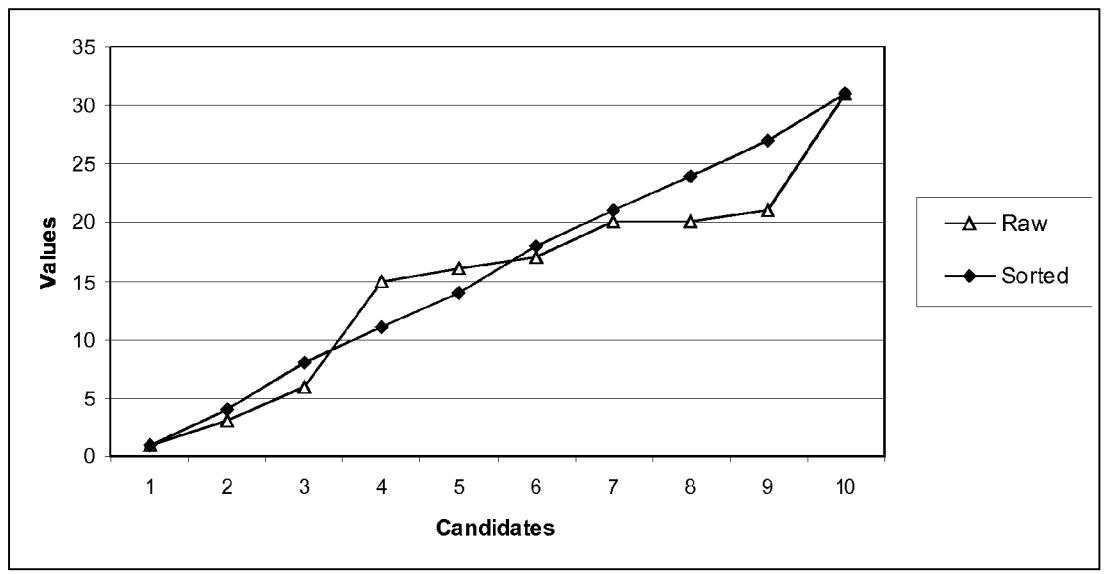
*Graph 1*
*FIG. 2 - Raw Values Relative to Simple Sorted Order*

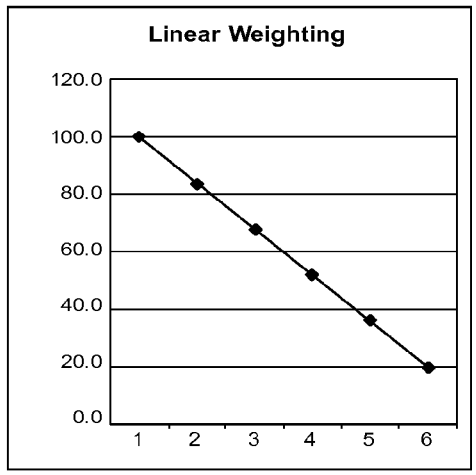
Graph 2
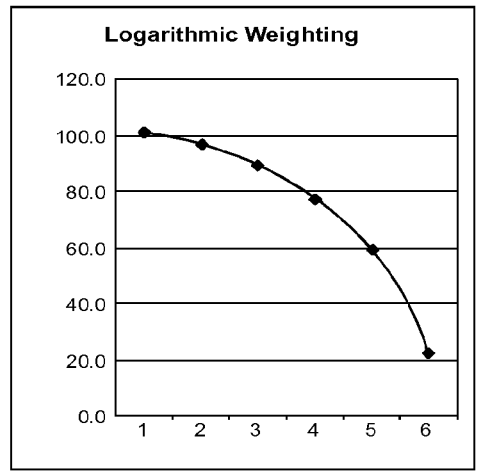
Graph 3
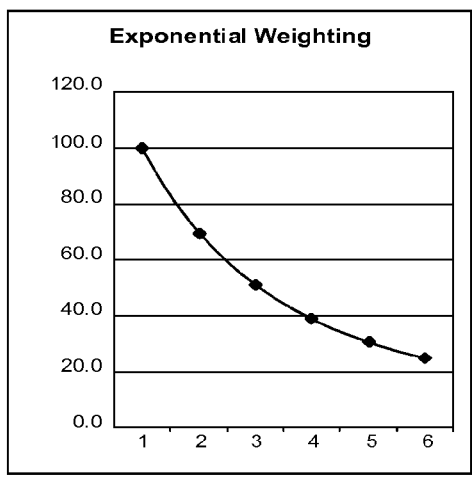
Graph 4
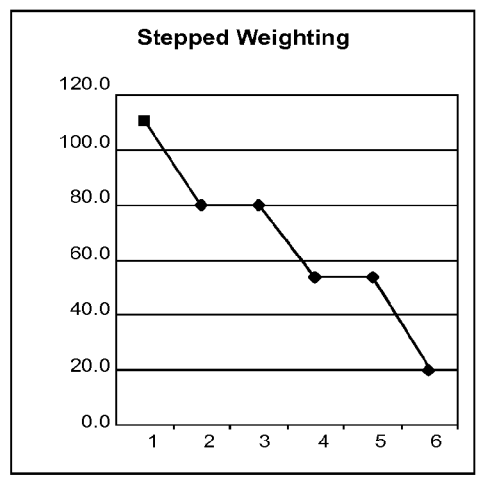
Graph 5
*FIG. 3 - Effect of Weighting Algorithms*

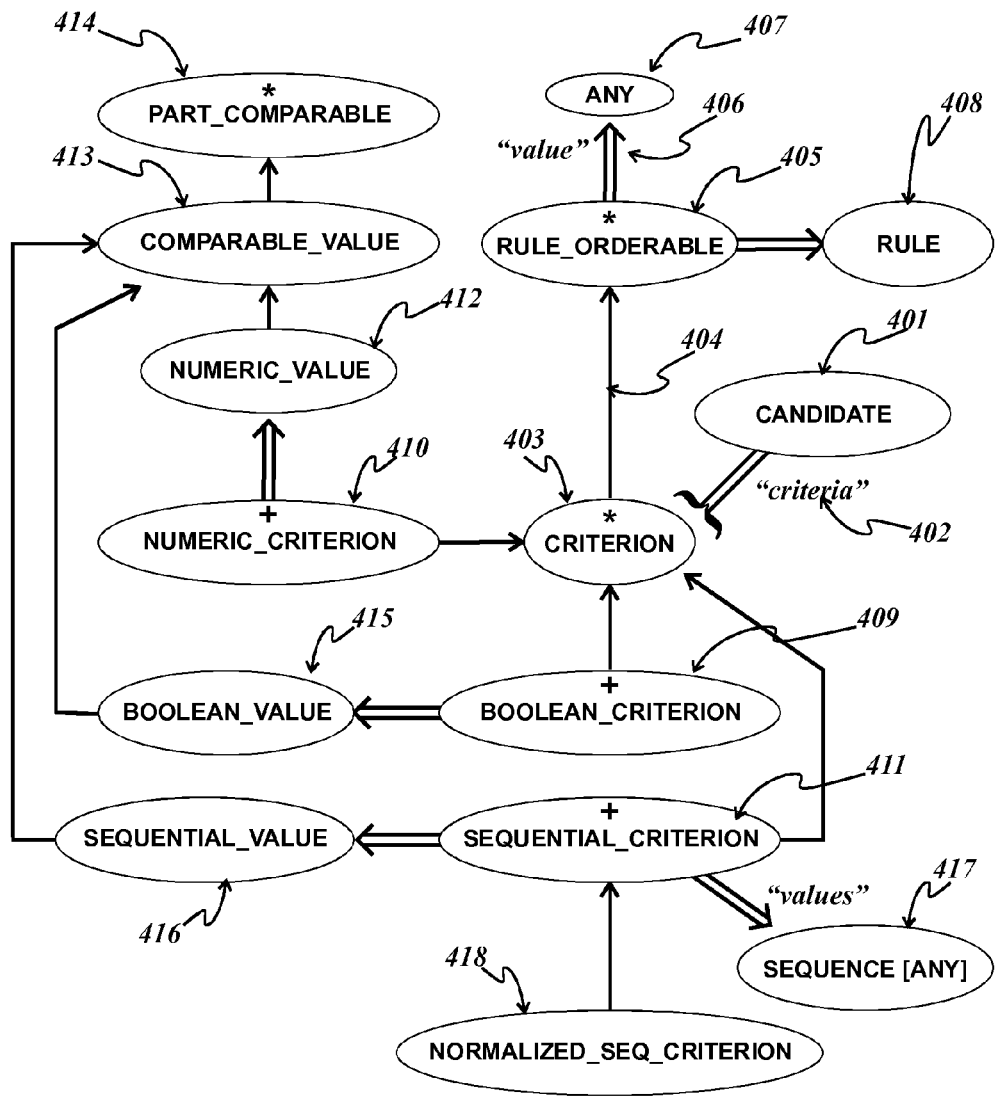
FIG. 4 - Simplified Data Model

US 8,886,586 B2

METHOD FOR MAKING OPTIMAL SELECTIONS BASED ON MULTIPLE OBJECTIVE AND SUBJECTIVE CRITERIA

This invention claims priority to U.S. Provisional Patent Application No. 61/180,875 filed May 24, 2009.

BACKGROUND OF THE INVENTION

This invention relates generally to decision and selection support logic.

There are many decision support systems available currently. Most are specialized for a given subject matter. Many focus on a yes/no decision and there are some that focus on selection from multiple options. Decision support systems intend to consider multiple, possibly complex, factors in an objective, impersonal and emotionless manner.

A common method is to develop a decision tree, making selections at each node in the tree to eliminate one candidate in favor of another. The requirement for these systems is that the candidates are inherently comparable by being numeric. Decision trees also eliminate candidates from consideration as the tree is traversed. This is analogous to a directed sequence of filters and can lead to premature elimination of some candidates.

It would be advantageous to have a method by which all important factors for a decision, whether measurable or not, objective or not, could be considered when making decisions. Additionally, it would be advantageous for such a method to prevent suboptimal decisions due to premature elimination of candidates.

BRIEF SUMMARY OF THE INVENTION

In accordance with the present invention, a method for decision making considers multiple factors, including but not limited to numeric factors. A method for decision making also avoids premature elimination of factors. The method of the present invention considers all possible factors, not simply those that have numeric values, and does so without premature elimination of factors.

The method of the present invention accepts sets of candidates for each of the criteria to be considered, normalizes and ranks, per criterion, the values associated with each candidate according to rules defined for that criterion, and assembles the normalized and ranked candidates into a matrix organized by priority of criterion. The method then applies a weighting function to the prioritized criteria in the matrix, and by association to the per-candidate values for each criterion. The result is a weighted rank order for the candidates that considers the totality of criteria, without premature candidate elimination.

LIST OF TABLES

Table 1 depicts a matrix of values associated with candidates and criteria.
Table 2 depicts a set of numeric values arranged in a simple sorted order.
Table 3 shows example candidate values, with their proportional values, normalized to 10 positions.
Table 4 shows pre-defined normalization rules in the preferred embodiment.
Table 5 shows a normalized matrix of candidates, criteria, and associated values.
Table 6 shows an example weighted matrix.
Table 7 shows an example weighted matrix with an adjusted criteria priority.

BRIEF DESCRIPTION OF THE SEVERAL VIEWS OF THE DRAWING

The present invention may be better understood by referring to the following description taken in conjunction with the accompanying drawings in which:

FIG. 1 depicts the overall logic flow of the method of the present invention,

FIG. 2 depicts a graph of raw values and their equivalents in simple sorted order, FIG. 3 includes 3 graphs that illustrate the effect of different weighting algorithms (linear, logarithmic, exponential and stepped), and FIG. 4 depicts a simplified data model reflecting the relationships amongst criteria, candidates and values.

DETAILED DESCRIPTION OF THE INVENTION

The method of the present invention first accepts a matched set of candidates and criteria, such that for each criterion, there is a corresponding set of candidates. Each candidate is uniquely identifiable and, for each criterion there is a value. Values have types in that, for each candidate, the value corresponding to a criterion is of the type associated with that criterion. Types need not be numeric; they need only be comparable according to a defined rule associated with that type. Values in the input are typically unordered, but can be pre-ordered. Values can be inherently objective and measurable, or can be subjective. Values need only be orderable according to an ordering rule associated with the values' type. For example, a criterion for a decision to purchase a television set might be something like "Brand preference". This is likely subjective, but presumably the interested party has an ordered list of brands, or even a single favorite brand. In the preferred embodiment, values for "Brand preference" would belong to a special type defining the ordering rule for values of that type.

TABLE 1

Candidates, Criteria and Values

| | Criteria | | | |
|---|---|---|---|---|
| | Criterion A | Criterion B | Criterion C | Criterion D |
| Candidate 1 | Value A1 | Value B1 | Value C1 | Value D1 |
| Candidate 2 | Value A2 | Value B2 | Value C2 | Value D2 |
| Candidate 3 | Value A3 | Value B3 | Value C3 | Value D3 |
| Candidate 4 | Value A4 | Value B4 | Value C4 | Value D4 |
| Candidate 5 | Value A5 | Value B5 | Value C5 | Value D5 |
| Candidate 6 | Value A6 | Value B6 | Value C6 | Value D6 |

Table 1 depicts a matrix of values associated with candidates and criteria where, for example, Value A1 is the value of Candidate 1 with respect to Criterion A. Input to the method need not be in table form; the table is for illustration of the relationships amongst the components.

For each criterion, the method determines the relative rank of each candidate according to the rules associated with that criterion's type. Criterion types include basic types such as numeric and Boolean, as well as more complex types, including context-specific types (e.g. the "Brand preference" type in the previous example).

FIG. 1 represents the overall flow of logic in the method. Major processes within the flow include Assembly (Item 101), Normalization (Item 104), Prioritization (Item 105) and Weighting (Item 108). Initial gathering of candidates, criteria and values is omitted from the flow diagram, and can be accomplished in any manner that produces suitable input to the process (e.g. by means of a database query).

Value Normalization

The method of the present invention includes a normalization process (Item 104 in FIG. 1). The normalization process is responsible for applying, to candidate values, the rules associated with a criterion. A simple example would have 10 candidates whose values, for a numeric criterion would be {20, 31, 1, 15, 3, 6, 16, 17, 20, and 21}. In such a case, the values would be normalized to a range of 1 through 10 (to align with the number of candidates). Table 2 shows these values arranged in a simple sorted order.

TABLE 2

Simple Value Ordering

|  | Raw Value | Rank | Points |
|---|---|---|---|
| Candidate 3 | 1 | 10 | 1 |
| Candidate 5 | 3 | 9 | 2 |
| Candidate 6 | 6 | 8 | 3 |
| Candidate 4 | 15 | 7 | 4 |
| Candidate 7 | 16 | 6 | 5 |
| Candidate 8 | 17 | 5 | 6 |
| Candidate 1 | 20 | 3 | 8 |
| Candidate 9 | 20 |  |  |
| Candidate 10 | 21 | 2 | 9 |
| Candidate 2 | 31 | 1 | 10 |

Rank in this example is almost literally the sort order, with the minor exception of a tie for $3^{rd}$ place. In some contexts, this might be reasonable, but the distribution is not uniform, and so a more elaborate rule might be applied in some contexts. The primary motivation for the method's use of per-criterion rules is to derive the best possible decisions, in a variety of contexts. The method is therefore easily extensible in that rules can be defined per criterion for any context. For example, candidate 2 has a value of 31, putting it in $1^{st}$ place (with 10 points), and candidate 10 has a value of 22 (over 32% less than candidate 10) but by being in $2^{nd}$ place, has 9 points (only 10% less than for candidate 2). At least superficially, this seems inequitable, as candidate 10 appears to be getting more credit than it deserves and this might lead to a suboptimal decision.

Graph 1 in FIG. 2 depicts the raw values from the previous example, along with the straight-line function resulting from simple sorting (1, 2, 3, 4, 5, 6, 7, 8, 9, 10). It is clear that the straight line and the raw values line deviate from each other, especially for candidates 4, 5, 8 and 9.

Normalization considers not only the minimum and maximum values, but the expected distribution and range of values, as defined for a criterion. For example, the range of possible values might be 1 though 32, but a value of 16 might not be the median and should not be treated as such when ranked (depending on context), so a simple linear proportion might be inappropriate in that case. Another example might have raw statistical data whose standard deviation must be considered and the value interpreted in that manner. Still another example might have data that requires smoothing with a logarithmic function.

For illustration, assume that the values in the preceding example are directly proportional to their importance in the decision making process. A criterion rule can be defined such that the normalization process results in a more equitable point award. A simple interpretation of proportional value would normalize the value by the ratio of a value to the maximum value in the range (it is also reasonable to define a minimum and/or maximum for a range, and compare a value to the range). Table 3 shows the candidate values from the example, with their proportional values, normalized to 10 positions (to align easily with 10 candidates) using a simple rounding operation.

TABLE 3

Proportional Value Ordering

|  | Raw Value | Ratio to Max | Points |
|---|---|---|---|
| Candidate 3 | 1 | 0.032258 | 1 |
| Candidate 5 | 3 | 0.096774 |  |
| Candidate 6 | 6 | 0.193548 | 2 |
| Candidate 4 | 15 | 0.483871 | 5 |
| Candidate 7 | 16 | 0.516129 |  |
| Candidate 8 | 17 | 0.548387 |  |
| Candidate 1 | 20 | 0.645161 | 6 |
| Candidate 9 | 20 |  |  |
| Candidate 10 | 21 | 0.677419 | 7 |
| Candidate 2 | 31 | 1 | 10 |

Using a simple ratio rule, the normalization process awards points more appropriately relative to the example context. A simple ratio is not always an option, as the values have different semantics in different contexts. The method allows for all manner of normalization and ranking rules.

The preferred embodiment includes pre-defined normalization rules, as described in Table 4.

TABLE 4

Pre-defined Normalization Rules

| Rule | Type | Default Order | Options |
|---|---|---|---|
| Existential | Boolean | Ascending (True > False) | Range min/max |
| Proportional | Numeric | Ascending | Range min/max |
| Stepped | Numeric | Ascending | Number of steps; Step positions |
| Deviation | Numeric | Descending | Sign bias |
| Logarithmic | Numeric | Ascending | Base |

Sorting and Weighting Criteria

A decision typically involves multiple criteria, and these criteria can be independent. While it is possible, it is also unlikely that all criteria in a decision context would have the same priority. For example, price might have a higher priority than the length of warranty period. To achieve higher quality decisions, the method of the present invention orders the criteria by importance to the decision.

Table 5 shows a (simplified) matrix of candidates and criteria for a television purchase as might be produced by the normalization process. Note that, because there are 5 candidates, values are normalized to 5.

TABLE 5

Example Normalized Matrix

|  | Price | Resolution | Contrast | Warranty | Brightness | Raw Total |
|---|---|---|---|---|---|---|
| TV 1 | 3 | 5 | 2 | 3 | 3 | 16 |
| TV 2 | 1 | 5 | 5 | 5 | 5 | 21 |
| TV 3 | 2 | 5 | 3 | 3 | 4 | 17 |
| TV 4 | 5 | 1 | 1 | 1 | 1 | 9 |
| TV 5 | 3 | 5 | 5 | 3 | 2 | 18 |

From the raw totals, it seems there is a leading candidate. In most decision making processes, the work would be done, but the analysis would be inadequate unless all criteria were equally important. Simply sorting by the relative importance of the criteria does not change the total, but the weighting process does.

Once the criteria have been sorted in priority order, the weighting rules can be applied. Weighting rules take the raw values and, using a context-specific algorithm, transform the raw values into values weighted by the position of a criterion in the priority order. For example, using a simple linear weighting rule, the highest priority criterion might receive a weighting value of 100 and the lowest might receive 20. This weighting value would then be applied to the raw value to yield the weighted values that make the final decision. Graphs 2, 3, 4 and 5 in FIG. 3 illustrate the effect of 4 example weighting algorithms (linear, logarithmic, exponential and stepped).

Depending on the rule, different candidates might appear as the leading candidate. For illustration, using the values from Table 5, including the order of criteria (left-to-right from most to least important), weighting rules could yield the following weighted totals (Table 6).

TABLE 6

Example Weighted Matrix

|      | Raw | Linear | Log    | Square | Stepped |
|------|-----|--------|--------|--------|---------|
| TV 1 | 16  | 1000.0 | 1294.2 | 752.0  | 1160.0  |
| TV 2 | 21  | 1100.0 | 1543.8 | 700.0  | 1300.0  |
| TV 3 | 17  | 980.0  | 1311.5 | 692.0  | 1140.0  |
| TV 4 | 9   | 700.0  | 824.8  | 620.0  | 740.0   |
| TV 5 | 18  | 1160.0 | 1502.2 | 856.0  | 1320.0  |

While any number of different weighting algorithms might be used, the net effect is very important. In all but the Log case, weighting has produced a different outcome than the raw points totals had, selecting TV 5 as the leading candidate in 3 of the 4 weightings.

Changing the priority order of criteria can also have a significant effect on the outcome. Again, taking the example values, but adjusting the priority such that resolution becomes the most important criterion, with contrast second, and price being third, the results are slightly different, as seen in Table 7.

TABLE 7

Example Weighted Matrix with Different Priority

|      | Raw | Linear | Log    | Square | Stepped |
|------|-----|--------|--------|--------|---------|
| TV 1 | 16  | 1020.0 | 1302.7 | 796.0  | 1120.0  |
| TV 2 | 21  | 1260.0 | 1641.1 | 956.0  | 1460.0  |
| TV 3 | 17  | 1060.0 | 1357.7 | 828.0  | 1180.0  |
| TV 4 | 9   | 540.0  | 727.5  | 364.0  | 580.0   |
| TV 5 | 18  | 1240.0 | 1550.8 | 984.0  | 1400.0  |

With the change in priority for price, now only the Square weighting makes TV 5 the leading candidate, with TV2 being the leading candidate in the other 3 weightings (as well as the raw ranking as before).

The choice of which weighting to use depends on context, and on the criteria involved. In some contexts, there can be a criterion that is significantly more important that the next most. In that case, an exponential weighting will ensure that the most important criterion is considered appropriately. For example, to make a decision about a dog to get for one's children, the criteria might include the dog's health, age, cost, breed, color of coat and so forth. It seems reasonable that health would be more important than coat color. If each criterion were given a value on a scale of 1 to 10, with respect to importance, health would get 10 points, with breed, cost, age and coat color getting 9, 8, 3 and 2 points respectively. This fits an exponential weighting model. If the same criteria, again on a hypothetical scale of 1 to 10, were given a different weighting, perhaps 10, 5, 2, 1 and 1 respectively, then the weighting model is logarithmic. The weighting model is intended to reflect the actual priority of the criteria to the interested party.

Weighting is not, however, intended as a pass/fail filter. That kind of operation should be performed when developing the list of candidates, before applying the decision making method. Using the family dog example, if one of the children had allergies to certain breeds, then dogs belonging to those breeds would not be candidates in the first place. There would be no reason, in that example, to use a criterion like "Hypoallergenic". If, on the other hand, allergic reaction was not a serious issue, i.e. not a pass/fail filter, then a simple Boolean criterion would be appropriate. While it is possible to use the method as a pass/fail filter, with a combination of priority and weighting, simple yes/no answers can be derived using established methods.

In some contexts, it might be desirable to use multiple weightings and to apply a function to those outcomes to create a final decision.

The method is not limited to a single pass through a set of values. It is reasonable to expect that the method can be applied to subsets of criteria, using different priority and weighting rules for each subset. The resulting weighted rankings could then be used as input to a separate application of the method.

In the preferred embodiment, software classes represent candidates, criteria and values. FIG. 4 depicts a simplified data model, as might be used in the preferred embodiment, reflecting the relationships amongst criteria, candidates and values. Item 401 denotes the CANDIDATE class, representing a candidate. Item 402 denotes a 1:N client-supplier relationship where a candidate has 'N' criteria, each of type CRITERION (Item 403). CRITERION is an abstract class that inherits RULE_ORDERABLE (Item 405), also abstract. RULE_ORDERABLE has a feature called "value" (Item 406) of type ANY (Item 407). The diagram shows 3 subclasses of CRITERION: BOOLEAN_CRITERION (Item 409), NUMERIC_CRITERION (Item 410) and SEQUENTIAL_CRITERION (Item 409). The diagram omits context-specific subclasses of CRITERION for simplicity. Because CRITERION inherits RULE_ORDERABLE, each object of that type and any of its descendent types also has a feature called "value". BOOLEAN_CRITERION, NUMERIC_CRITERION and SEQUENTIAL_CRITERION each redefine the type of "value" (covariantly) to any appropriate type for that subclass. All classes inherit at least implicitly from ANY (Item 407), though FIG. 4 omits most of the arrows showing that inheritance, for simplicity.

RULE_ORDERABLE has a feature of type RULE (Item 408). Because CRITERION inherits RULE_ORDERABLE, each object of that type and any of its descendent types also has a feature of type RULE. SEQUENTIAL_CRITERION has a feature called "values" of type SEQUENCE [ANY] (Item 417) and is a data structure containing items conforming to type ANY. NORMALIZED_SEQ_CRITERION (Item 418) is a subclass of SEQUENTIAL_CRITERION.

Each subclass of CRITERION has a subtype-specific value, and each of these inherits from COMPARABLE_VALUE (Item 413), that in turn inherits from PART_COMPARABLE (Item 414). The rule associated with a CRITERION (from RULE_ORDERABLE), is a feature of the CRITERION subclasses (via inheritance).

Boolean values in the described data model are quite simple, having values of either True or False. It is also possible to support a third value of Undefined (or Unknown), but FIG. 4 does not show this, in the interest of simplicity. The rule associated with the BOOLEAN_CRITERION might order Boolean values with True as the highest or with False as the highest, depending on context. The preferred embodiment uses a flag to denote the ranking order. The flag is called 'is_descending' and is by default False, meaning that value ordering by default is ascending, with True being "greater than" False.

Numeric values are also relatively simple. While there can be various subclasses of NUMERIC_VALUE (e.g. for integer and floating point), FIG. 4 omits any such examples, for simplicity. Numeric values, like Boolean values, can be ascending or descending.

Numeric values, unlike their Boolean counterparts, have a wide range of possible values, and a collection of values might not represent a linear function. A context might call for positive and negative values. A context might evaluate deviation from median as the point of comparison.

Sequential values (i.e. values associated with SEQUENTIAL_CRITERION) are pre-ordered sets of values. For a given sequential criterion, each candidate would, according to the data model of the preferred embodiment, have reference to the same ordered set. Because the NORMALIZED_SEQ_CRITERION class is a subclass of the SEQUENTIAL_CRITERION class, it has an associated pre-ordered value set, but the value set is further specialized to be pre-normalized according to a pre-defined rule.

Uses

The preferred embodiment would provide multiple modes of operation, including an interactive mode. In an interactive mode, a user or other entity would be able to manipulate the priority of the criterion as desired.

It might be desirable in some contexts to use this capability to browse possible combinations or priorities, also possibly eliminating one or more criteria or candidates, until a desired outcome is achieved. While this is not strictly speaking a decision making process, it might be useful for developing advertising and marketing materials that emphasize the characteristics of one product over another. A batch-like mode might be used to generate this sort of information automatically.

Consumer purchase decisions are a good application of the invention. The capabilities could be embodied in on-line or in-store kiosk-like applications that accept a consumer's preferences and use patterns, and translates them into comparable criteria and eventually into a decision.

While the example used a TV set purchase for illustration, the method is not limited to electronics purchases (or even to purchases). The method is applicable to all manner of decision making and selection, even to scheduling (i.e. decisions and selections of time slots). The method is also not limited to single-selection results, as the candidates are ranked according to criteria as part of the method.

The method of the present invention, by considering all factors and not eliminating candidates prematurely, results in a higher quality decision. The objective nature of the process, even if some of the criteria might be themselves subjective, adds credibility and traceability to the process and to the result.

Embodiments provide for various methods for making optimal decisions based on multiple objective and subjective criteria. For instance, a first example method comprises a method for making optimal decisions amongst multiple options by considering multiple criteria. A second example method comprises the first example method, wherein criteria can be numeric or non-numeric. A third example method comprises the first example method, wherein criteria can be subjective or objective. A fourth example method comprises the first example method, wherein multiple criteria of different forms, including numeric, non-numeric, objective and subjective, may be considered in any combination. A fifth example method comprises the first example method, wherein the decision making prevents premature elimination of criteria. A sixth example method comprises the first example method, wherein options are ranked according to their respective values related to the full set of criteria being considered. A seventh example method comprises the first example method, wherein raw option ranking is weighted by a variety of schemes, including but not limited to linear, exponential and step functions. An eighth example method comprises the first example method, wherein a weighting scheme may be predetermined. A ninth example method comprises the first example method, wherein application of weighting schemes may be interactively selected and applied. A tenth example method comprises the first example method, wherein weighting schemes may be defined by a user of the method. An eleventh example method comprises the first example method, wherein relative importance of criteria are predefined. A twelfth example method comprises the first example method, wherein relative importance of criteria are assigned interactively.

What is claimed is:

1. A computer-implemented method for making optimal decisions, the method comprising, by a processor:
   receiving a plurality of candidates from an interested party;
   receiving a plurality of criteria associated with a characteristic of the plurality of candidates, each of the plurality of criteria being associated with a type;
   receiving values, from the interested party, for each of the plurality of criteria for each of the plurality of candidates, wherein the values have one of a numerical form or a non-numerical form based on the type;
   normalizing the values for each of the plurality of criteria by applying normalization rules associated with each of the plurality of criteria, wherein the normalization rules comprise at least one of minimum and maximum values, expected distribution, and range of values;
   generating a raw candidate ranking by ranking the plurality of candidates for each of the plurality of criteria;
   receiving a context-based weight model for each of the plurality of criteria, each context-based weight model being configured to indicate a priority of each of the plurality of criteria wherein the context-based weight model comprises an exponential weighting rule configured to prioritize a most important criteria of the interested party;
   generating a weighted ranking of the plurality of candidates by applying the context-based weight model for each of the plurality of criteria to the raw candidate ranking; and
   sorting the plurality of candidates based on the weighted ranking, thereby generating a weighted list of the plurality of candidates sorted through a comparison of each of the plurality of criteria without premature candidate elimination.

2. The computer-implemented method of claim 1, wherein each candidate is uniquely identifiable and represents a decision option.

3. The computer-implemented method of claim 1, wherein the values represent a relationship between the plurality of candidates and the plurality of criteria.

4. The computer-implemented method of claim 1, wherein the values comprise subjective values.

5. The computer-implemented method of claim 1, wherein the values comprise at least one of the following: subjective values, objective values and context-based values.

6. The computer-implemented method of claim 1, wherein the values are normalized using at least one of the following normalization rules: existential, proportional, stepped, deviation, and logarithmic.

7. The computer-implemented method of claim 6, wherein the normalization rules are applied on a per-criterion basis.

8. The computer-implemented method of claim 1, wherein at least a portion of the plurality of criteria are associated with values comprising pre-ordered sets of values.

9. The computer-implemented method of claim 8, wherein the pre-ordered sets of values are pre-normalized according to at least one pre-defined rule.

10. The computer-implemented method of claim 1, wherein the weight model comprises at least one of the following models: exponential, raw, linear, logarithmic, square, and stepped.

\* \* \* \* \*